(12) United States Patent
Beverly et al.

(10) Patent No.: US 7,415,869 B2
(45) Date of Patent: Aug. 26, 2008

(54) VEHICLE BRAKE PRESSURE MONITORING SYSTEM AND METHOD

(75) Inventors: James A. Beverly, Kalamazoo, MI (US); Stephen P. Claussen, Richland, MI (US); Gerard O. McCann, Kalamazoo, MI (US)

(73) Assignee: Dana Heavy Vehicle Systems Group, LLC, Toledo, OH (US)

( * ) Notice: Subject to any disclaimer, the term of this patent is extended or adjusted under 35 U.S.C. 154(b) by 135 days.

(21) Appl. No.: 11/116,768

(22) Filed: Apr. 28, 2005

(65) Prior Publication Data

US 2006/0243037 A1    Nov. 2, 2006

(51) Int. Cl.
*G01L 3/26* (2006.01)
*G01M 15/00* (2006.01)

(52) U.S. Cl. ........................................ 73/112
(58) Field of Classification Search .............. 73/112
See application file for complete search history.

(56) References Cited

U.S. PATENT DOCUMENTS

| | | | | |
|---|---|---|---|---|
| 3,001,831 A | * | 9/1961 | Stelzer | 303/7 |
| 3,507,542 A | * | 4/1970 | Cannella | 303/7 |
| 4,090,738 A | * | 5/1978 | Bray | 303/7 |
| 4,313,483 A | * | 2/1982 | Brockmann | 152/416 |
| 4,593,954 A | | 6/1986 | Campanini | |
| 4,619,303 A | | 10/1986 | Bryan | |
| 4,640,331 A | * | 2/1987 | Braun et al. | 152/417 |
| 4,763,959 A | | 8/1988 | Vandemotter | |
| 4,877,294 A | | 10/1989 | Kuhn et al. | |
| 5,172,958 A | | 12/1992 | Sell | |
| 5,313,995 A | * | 5/1994 | Schultz | 152/416 |
| 5,327,116 A | | 7/1994 | Davidson | |
| 5,328,251 A | * | 7/1994 | Brearley | 303/9 |
| 5,533,866 A | | 7/1996 | Malecha | |
| 5,592,754 A | | 1/1997 | Krieder et al. | |
| 5,647,927 A | * | 7/1997 | Mason | 152/415 |
| 5,823,637 A | | 10/1998 | Blue | |
| 6,079,436 A | | 6/2000 | Delfs et al. | |
| 6,367,887 B1 | | 4/2002 | Sulzyc | |
| 6,447,075 B2 | | 9/2002 | Ross et al. | |
| 6,578,932 B2 | * | 6/2003 | Sakata | 303/114.1 |
| 6,682,459 B1 | | 1/2004 | Knight | |
| 2002/0195870 A1 | | 12/2002 | Brunson et al. | |
| 2004/0207531 A1 | | 10/2004 | Walch | |
| 2006/0097569 A1 | * | 5/2006 | Eberling et al. | 303/122.15 |

* cited by examiner

*Primary Examiner*—Edward Lefkowitz
*Assistant Examiner*—Octavia Davis
(74) *Attorney, Agent, or Firm*—Marshall & Melhorn LLC

(57) ABSTRACT

The present invention relates to a vehicle brake system, which has a brake reservoir, and utilizes a tire management system that is in communication with the brake reservoir and a vehicle operator. As a result of this configuration, the tire management system communicates brake reservoir pressure signals to the vehicle operator, so that the operator is made aware of any low pressure conditions, in the trailer, before trying to move the trailer.

2 Claims, 3 Drawing Sheets

VEHICLE BRAKE PRESSURE MONITORING SYSTEM AND METHOD

FIELD OF THE INVENTION

The present invention relates to a system for monitoring the pressure in a vehicle brake system, while utilizing a tire management system. More particularly, the present invention relates to a system and a method for monitoring the pressure in a vehicle brake reservoir, where a vehicle has an attached trailer that utilizes an existing tire management system.

BACKGROUND OF THE INVENTION

Those skilled in the art know that vehicles have a brake system (VBS), which, typically, has a brake reservoir for providing proper pressure levels of fluid (such as, air or a hydraulic fluid) within the brake system. It is further known that some vehicles (for example, trucks and tractors that pull trailers) have a tire management system (TMS), which uses pressurized air from a VBS reservoir to maintain pneumatic pressure in the vehicle tires. Often, the TMS is associated with a trailer attached to the vehicle.

Unfortunately, current vehicle air brake systems, with "spring brake priority," allow a vehicle operator to move the trailer, regardless of the pressure level in the VBS reservoir. Consequently, it is possible to operate the trailer without adequate VBS reservoir pressure to stop the trailer. Low VBS reservoir pressure may be caused by a number of factors, for example, a faulty spring brake valve or a significant, though not gross, leak in the reservoir itself. In other circumstances (such as in a multiple trailer application), VBS reservoir pressure may be too low to hold off the spring brakes, resulting in overheated brakes.

Examples of relevant art involving a brake air pressure supply or VBS reservoir pressure are as follows. U.S. Pat. No. 4,593,954 to Campanini describes an air brake valve system. The air brake valve system has a valve cluster on the trailer responsible for filling and protecting the pressure in the air reservoir tank. The valve cluster has a low pressure warning means in the tractor to warn the operator of low air reservoir tank pressure. The valve cluster comprises a mechanical system that determines when the air reservoir tank pressure is too low.

U.S. Pat. No. 4,763,959 to Vandermotter provides for an electronic control for a vehicle braking system. The system includes a supply reservoir connected to the compressor of the vehicle. A pressure sensor is directly connected to the supply reservoir, which is connected to a front and a rear service reservoir. The front and rear service reservoir each have individual pressure sensors. These pressure sensors are connected to an electronic control unit, which monitors these pressure sensors.

U.S. Pat. No. 4,877,294 to Kuhn et al. teaches a tractor-trailer braking system having an electric pressure transducer disposed to sense the pressure of compressed air in the pneumatic power supply. The pressure transducer is mounted on the supply tank to sense the pressure inside of the tank. Kuhn also indicates that the transducer acts via electronics to operate an alarm in the operator's compartment, should the sensed pressure increase above, or decrease below, a predetermined amount.

U.S. Pat. No. 5,172,958 to Sell discloses a similar air brake valve system to that in Campanini, discussed above, however, the disclosure in Sell indicates three valve clusters can be used. A first valve cluster controls the passage of compressed air from the emergency gladhand supply line to the spring air brakes. A second valve cluster controls the filling and protection of the air reservoir tank. The third valve cluster eliminates compounding of the braking forces by the service brakes when the spring brakes have been applied.

U.S. Pat. No. 5,533,866 to Malecha teaches a pressurized air brake system for a vehicle comprising a first reservoir and a second reservoir connected to an air compressor. The first and second reservoirs are connected to a control system. The control system is also connected to the compressor for actuating and disengaging the compressor in response to air pressure levels in the first and second reservoirs. Malecha indicates that the reservoirs are connected to service brakes of the tandem and trailer, parking brakes, and wipers, however, other components can also be connected to the reservoirs. Each reservoir has a switch containing a pressure diaphragm. The diaphragms toggle between activated positions and deactivated positions in response to air pressure changes in the reservoirs. Malecha also states that microprocessors and air pressure sensors can be used to monitor reservoir air pressure and control the compression of air by the air compressor.

U.S. Pat. No. 5,592,754 to Krieder et al. provides for a pressure transducer connected to a reservoir to sense the pressure in the reservoir. The transducer provides an electrical signal indicative of the pressure in the reservoir to an electronic controller. The controller uses the signal to control three different outputs: a low pressure warning lamp, a compressor control solenoid and a purge control solenoid. Krieder teaches that the controller is designed to control these items in lieu of three separate mechanical units.

U.S. Pat. No. 6,079,436 to Delfs et al. discloses a pressure sensor connected to an air supply line between a check valve and the compressed air container. The sensor communicates the sensed pressure to control electronics. The control electronics signal one of two pressure regulating valves. The valve is connected to an outlet valve that allows air from a compressor to at least one compressed air consumer.

U.S. Pat. No. 6,682,459 to Knight teaches a vehicle brake compressed air supply system having an electronic air charge controller (EAC) and a first and a second pressure sensor. The first pressure sensor measures the pressure within a line connected to a supply reservoir. The pressure in the line is indicative of the pressure in the reservoir. The sensed pressure is sent to the EAC so that it can determine if the pressure in the reservoir is below a pre-determined amount. If the pressure is below the pre-determined amount, a signal is sent to the engine to increase RPM.

It would, however, be safer and economically advantageous for a vehicle to utilize a vehicle brake systems in conjunction with an existing tire management system, to detect and warn the vehicle operator of low brake pressure conditions.

SUMMARY OF THE INVENTION

The present invention relates to a vehicle brake system, which has a brake reservoir that is in communication with a vehicle tire management system, which has a transducer that is in communication with a vehicle operator. As a result of this arrangement, the transducer communicates brake reservoir pressure signals to the vehicle operator so that the vehicle operator is aware of low brake pressure conditions in the vehicle.

Further advantages of the present invention will be apparent from the following description and appended claims, reference being made to the accompanying drawings forming a part of a specification, wherein like reference characters designate corresponding parts of several views.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
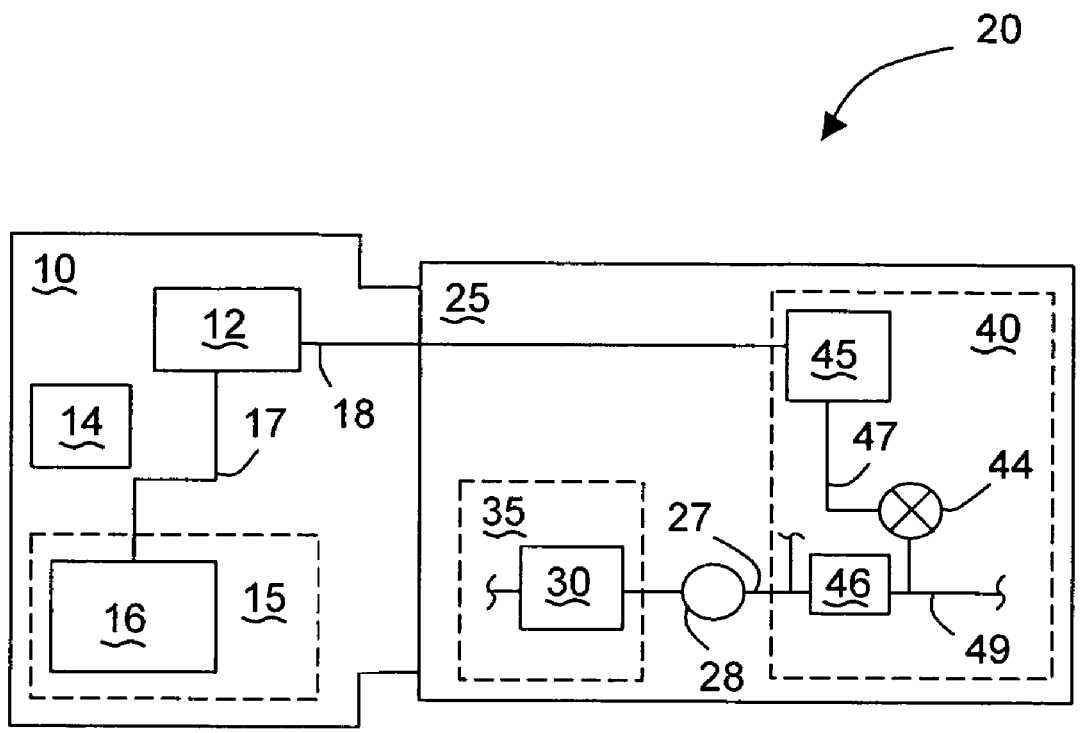
FIG. 1 is a diagrammatical illustration of a vehicle in accordance with the present invention.

FIG. 1 is a diagrammatical illustration of a vehicle 10, which may be, for example, a truck or a tractor, with a vehicle brake pressure monitor system (VPM) 20 disposed therewith. As illustrated, the vehicle 10 has an attached trailer 25. The vehicle 10 comprises a vehicle electronic control unit 12 (ECU), which may be a part of an engine, and a compartment 15, where a vehicle operator would be located. The vehicle 10 also comprises a warning device 16, which is in electrical communication with the ECU 12 by way of a first electrical line 17.

The VPM 20 comprises a brake reservoir 30 (provided on heavy duty truck trailers) that is part of a vehicle brake system 35 (VBS), a pressure protection valve 28, and a tire management system 40 (TMS). The TMS 40 may be a tire management system already installed on the vehicle 10. The TMS 40 is utilized to maintain a certain level of air pressure in the vehicle tires (not shown). The VBS 35 utilizes the brake reservoir 30 to assure that a level of air pressure is sustained and is available to the VBS 35 for proper braking of the vehicle 10. The pressure protection valve 28 is utilized in the VPM 20 to only allow air flow through the TMS 40 and then onto the tires, if the air pressure in the reservoir 30 is above a pre-set pressure limit. This design prevents the TMS 40 from depleting pressurized air from the brake reservoir 30 at the expense of the safety critical vehicle brake system 35.

It should be appreciated that in the present invention the trailer 25 is not required. In this embodiment, the truck or tractor, itself, would comprise the VPM 20, the TMS 40, and the VBS 35 with the brake reservoir 30. This embodiment, however, would function much the same as that described above for the embodiment with the trailer 25.

Again referring to FIG. 1, the TMS 40 comprises a first air line 27 that provides pressurized air from the brake reservoir 30 to a supply solenoid 46. The supply solenoid passes the pressurized air to a second air line 49. The air line 49 provides the pressurized air to, for example, the tires for maintaining air pressure within the tires. In turn, the air line 49 is connected to a pressure transducer 44, which already exists in the TMS 40.

It is a discovery of the present invention that an additional transducer is not required for communicating the pressure within the brake reservoir 30 to the ECU 12, since the existing transducer 44 may be utilized. In the present invention, the communicating of the pressure within the brake reservoir 30 is provided via a second electrical line 47. The second electrical line 47 electrically communications between the pressure transducer 44 and a controller 45 (a.k.a., tire management electronic control unit). The controller 45 would be disposed on the trailer 25 (or truck/tractor) and then electrically communicate brake pressure signals and/or various warning signals to the vehicle ECU 12 via a third electrical line 18.

It should be appreciated that the electronic control function provided by the controller 45 could be provided by a different controller (not shown) that might be disposed elsewhere on the trailer 25 (or truck/tractor), or by the vehicle ECU 12 itself, and still remain within the spirit and scope of the present invention.

Figure 2:
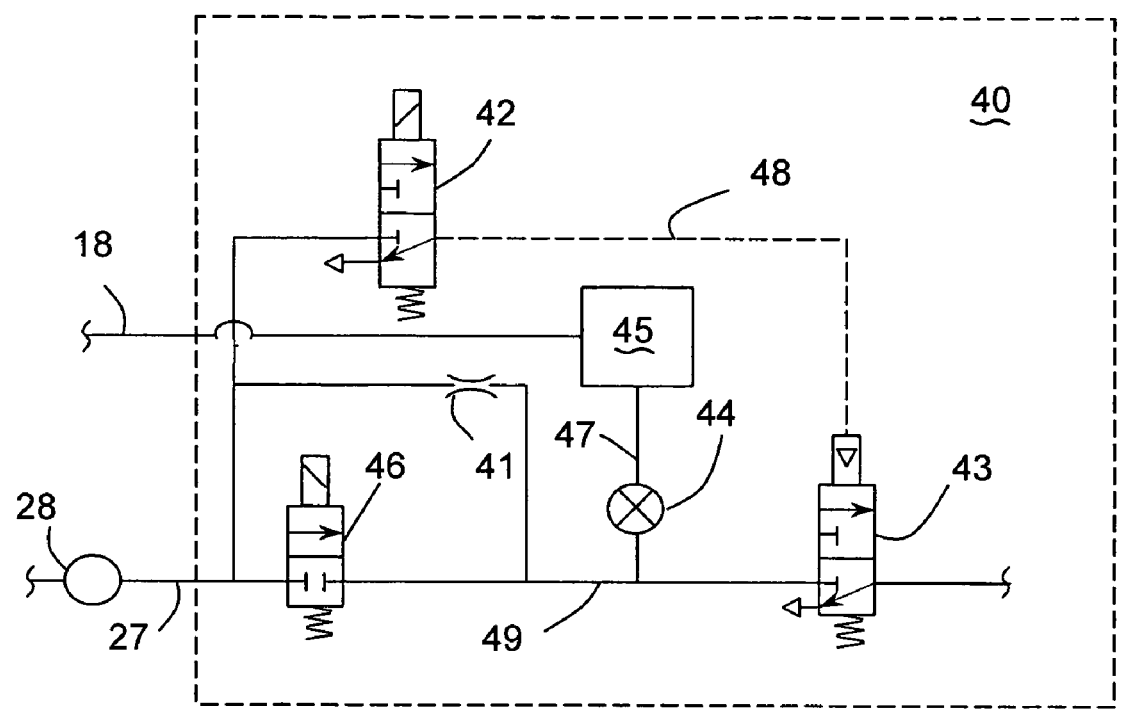
FIG. 2 is a schematic circuit in accordance with the vehicle of FIG. 1.

FIG. 2 illustrates a schematic circuit of the TMS 40, which comprises the first air line 27, a supply solenoid 46, a bleed air line 41, the pressure transducer 44, an exhaust valve 43, and a control solenoid 42. The first air line 27 has the supply solenoid 46 connected thereto. The bleed air line 41 is connected to the first air line 27 but bypasses the supply solenoid 46. The pressure transducer 44 is connected to the second air line 49 downstream of the supply solenoid 46, and the exhaust valve 43 is downstream of the pressure transducer 44 on the second air line 49. The exhaust valve 43 is controlled by the control solenoid 42 via control line 48, and the control solenoid 42 is connected to the first air line 27.

The air pressure (e.g., in pounds per square inch) in the brake air reservoir 30 is determined by sensing air pressure within the first air line 27 of the tire management system 40 with the pressure transducer 44. The pressure transducer 44 provides an electronic signal based on the monitored air pressure in the first air line 27. This electronic signal is transmitted to the tire management electronic control unit 45 of the vehicle 10.

The tire management electronic control unit 45 calculates an air pressure of the brake air reservoir 30 and then communicates a calculated air pressure signal of the brake air reservoir 30 to an operator of the vehicle 10 (for example, by way of the ECU 12 on the third electrical line 18, and then on to the warning device 16 in the vehicle compartment 15 by way of first electrical line 13). When the warning is activated, it is optionally possible that a data link message is generated (see FIG. 3 and the discussion below).

The warning device 16 may take, for example, the form of a pressure read out and/or lights to indicate the pressure levels. It is also conceivable to mount a warning lamp on the nose of the trailer 25. The warning devices 16 could be devices that are common in the art.

Figure 3:
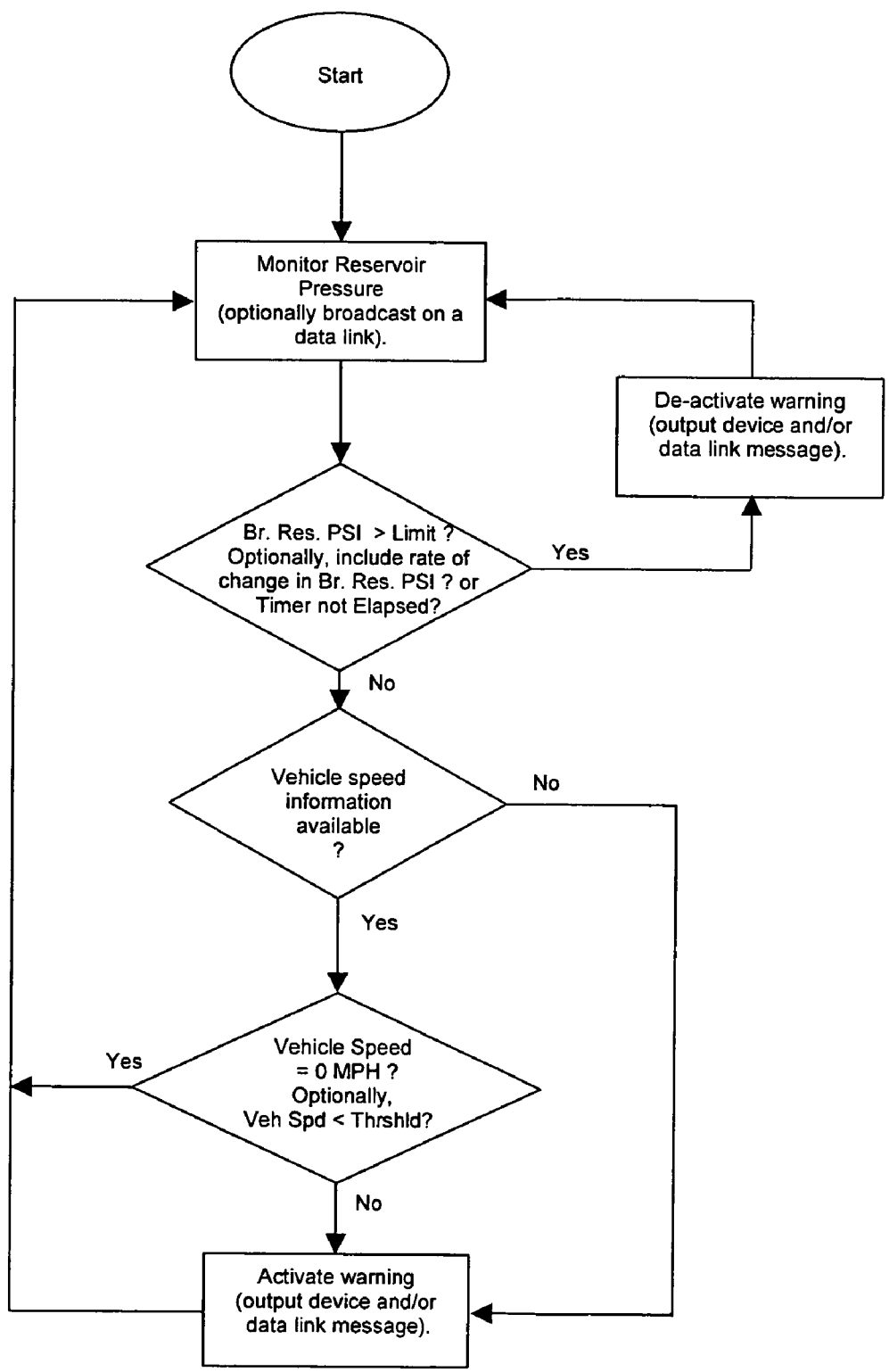
FIG. 3 is a flow chart of the logic in accordance with the present invention.

Illustrated in FIG. 3 is a flow chart of the logic of the present invention, where the brake reservoir 30 is in pneumatic communication with the tire management system 40. The pressure transducer 44 is in electrical communication with the controller 45. The controller 45 is also in electrical communication with the warning device 16 in the vehicle compartment 15, wherein the controller 45 begins a starting logic sequence (Start). The controller 45 then determines if the pressure in the brake reservoir 30 is greater than a brake reservoir pressure limit (pounds per square inch, PSI) and, if so, the controller 45 deactivates the warning device 16 and returns to the starting logic sequence.

If the pressure in the brake reservoir 30 is not greater than a brake reservoir pressure limit, the controller 45 determines if a vehicle speed (information) signal is available. If the controller 45 does not determine that the vehicle speed signal is available, then the controller 45 activates the warning device 16 and returns to the starting logic sequence.

The vehicle speed signals may be provided from the data link 18 (a.k.a. a third electrical line 18), from an anti-lock braking system (ABS) module (not shown) disposed on or near the trailer 25. The vehicle speed signals may also be provided other sources (truck/tractor), which may utilize a PLC4TRUCKS link (based on components available from Intellon Corporation), a radio frequency link, or an industry standard wired data bus (like Society of Automotive Engineers J1708 or J1587). In addition, the TMS controller 45 could be modified to utilize a separate hardwired speed sensor (not shown).

If the controller 45 does determine that the vehicle speed signal is available, then the controller 45 determines if the vehicle speed is equal to zero and, if so, then the controller 45 returns to the starting logic sequence. If the speed is not equal to zero, then the controller 45 activates the warning device 16 and returns to the starting logic sequence.

In addition to the logic sequences detailed above, the instant invention can include additional criteria that are indicated in FIG. 3 for monitoring brake pressure, for example:

a) at various steps within the logic sequence, optionally broadcast brake reservoir pressure and controller 45 decisions on the data link, b) provide a logic sequence step that would allow a movement of the trailer 25 at low speeds without providing a warning, but then communicate a warning if a certain vehicle speed threshold (for example, 10 miles per hour) were to be exceeded, c) utilize of a rate of change in a rising and/or a dropping of brake reservoir supply pressure to reduce annoyance warnings, d) determine the engine 14 revolutions per minute (RPM), in place of vehicle speed, e) determine if the air compressor (not shown) is running, in place of or in addition to determining the brake reservoir pressure, f) incorporate timers (for example, a reservoir pressure timer) into any of the logic sequence steps, before various actions or inactions would be taken, and/or g) utilize various speed and pressure sensors data to develop a Proportional Integral Derivative (PID) algorithm for warning of low air supply.

As a result of any of these added criteria or a combination thereof, control between the trailer 25 and ECU 12 could then be provided.

Additional efficiencies may be obtained when the TMS 40 is integrated into a controller (not shown) associated with the ABS. In such an arrangement, the electronic control unit 45, for the TMS 40, would actually be an ABS controller, which would control the ABS and also the TMS 40. This would allow sharing of wheel speed information, data links, and other information that would be present on the various electrical communication lines within the truck, tractor, and/or trailer.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. A method of monitoring a trailer brake reservoir pressure using a tire management system of a trailer, comprising:

providing an existing tire management system on a trailer, the tire management system comprising a trailer tire management electronic control unit having a trailer pressure transducer that is in communication with an air line that is in communication with a trailer brake reservoir;

determining an air pressure in the trailer brake air reservoir by sensing air pressure within the air line;

providing electronic signals from the trailer tire management electronic control unit that are based on the monitored trailer brake reservoir air pressure, wherein the trailer tire management electronic control unit calculates an air pressure of the trailer brake air reservoir; and communicating the trailer brake air reservoir pressure signals, via the tire management electronic control unit, to a tractor-trailer operator of the trailer;

thereby preventing the tractor-trailer operator from moving the trailer, and preventing the trailer tire management system from supplying trailer brake reservoir pressurized air to trailer tires.

2. The method of claim 1, further comprising providing a pressure protection valve that only allows air flow into the trailer tire management system and then onto trailer tires, if the air pressure in the trailer brake reservoir is above a pre-set pressure limit.

* * * * *